United States Patent
Nose et al.

(10) Patent No.: US 9,187,814 B2
(45) Date of Patent: Nov. 17, 2015

(54) HOT-DIP ALUMINUM ALLOY PLATED STEEL HAVING EXCELLENT SHEAR CUT EDGE CORROSION RESISTANCE AND PROCESSED PART CORROSION RESISTANCE, AND METHOD OF MANUFACTURING THE SAME

(75) Inventors: Koichi Nose, Tokyo (JP); Yasuhide Morimoto, Tokyo (JP); Kohei Tokuda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 579 days.

(21) Appl. No.: 13/575,072
(22) PCT Filed: May 31, 2011
(86) PCT No.: PCT/JP2011/062448
§ 371 (c)(1), (2), (4) Date: Jul. 25, 2012
(87) PCT Pub. No.: WO2011/152381
PCT Pub. Date: Dec. 8, 2011

(65) Prior Publication Data
US 2012/0295130 A1 Nov. 22, 2012

(30) Foreign Application Priority Data
May 31, 2010 (JP) .................... 2010-124933
Jun. 10, 2010 (JP) .................... 2010-133087

(51) Int. Cl.
*B32B 15/01* (2006.01)
*B05D 1/18* (2006.01)
(Continued)

(52) U.S. Cl.
CPC .... *C23C 2/12* (2013.01); *B05D 1/18* (2013.01); *B05D 3/02* (2013.01); *B05D 3/0254* (2013.01);
(Continued)

(58) Field of Classification Search
CPC .... B32B 15/011; B32B 15/012; B32B 15/18; C22C 21/00; C22C 30/00; C22C 38/002; C22C 38/02; C22C 38/06; C22C 38/005; C22C 2/28; C22C 2/12; C22C 2/04; C22C 2/285; C22C 30/005; Y10T 428/12757; Y10T 428/12958; Y10T 428/12972; Y10T 428/12979; Y10T 428/12569
USPC ......................... 428/653, 682, 626
See application file for complete search history.

(56) References Cited

FOREIGN PATENT DOCUMENTS

| JP | 62-176021 | 8/1987 |
| JP | 05-287492 | 11/1993 |

(Continued)

OTHER PUBLICATIONS

Machine Translation, Morimoto Yasuhide et al., JP 2009-120942, Jun. 2009.*

(Continued)

*Primary Examiner* — Michael E La Villa
(74) *Attorney, Agent, or Firm* — Kenyon & Kenyon LLP (57) ABSTRACT

The hot-dip aluminum alloy plated steel has a base steel and a plated layer, in which the composition of the plated layer contains, by % by mass, Fe: 25% to 75%, Mg: 2% to 20%, and Ca: 0.02% to 2% with a remainder of Al and inevitable impurities, the plated layer contains one or both of an α-Mg phase and an $Al_3Mg_2$ phase, and the sum of the partial volume fraction of the α-Mg phase and the partial volume fraction of the $Al_3Mg_2$ phase in a range of a depth of 5 μm from a surface of the plated layer is 1% to 40%.

11 Claims, 2 Drawing Sheets (51) Int. Cl.
*C23C 2/28* (2006.01)
*C23C 30/00* (2006.01)
*C23C 2/12* (2006.01)
*B32B 15/18* (2006.01)
*C23C 2/04* (2006.01)
*B05D 3/02* (2006.01)
*C22C 21/00* (2006.01)
*C22C 30/00* (2006.01)
*C22C 38/00* (2006.01)
*C22C 38/02* (2006.01)
*C22C 38/06* (2006.01)

(52) U.S. Cl.
CPC ............... *B32B 15/012* (2013.01); *B32B 15/18* (2013.01); *C22C 21/00* (2013.01); *C22C 30/00* (2013.01); *C22C 38/002* (2013.01); *C22C 38/005* (2013.01); *C22C 38/02* (2013.01); *C22C 38/06* (2013.01); *C23C 2/04* (2013.01); *C23C 2/28* (2013.01); *C23C 2/285* (2013.01); *C23C 30/00* (2013.01); *C23C 30/005* (2013.01); *Y10T 428/12569* (2015.01); *Y10T 428/12757* (2015.01); *Y10T 428/12958* (2015.01); *Y10T 428/12972* (2015.01); *Y10T 428/12979* (2015.01)

(56) References Cited

FOREIGN PATENT DOCUMENTS

| | | |
|---|---|---|
| JP | 05-311379 | 11/1993 |
| JP | 2002-012959 | 1/2002 |
| JP | 2004-244704 | 9/2004 |
| JP | 2004-250734 | 9/2004 |
| JP | 2009-120942 | 6/2009 |

OTHER PUBLICATIONS

International Search Report dated Aug. 9, 2011, issued in corresponding PCT Application No. PCT/JP2011/062448.

* cited by examiner

FIG. 4 ic field, an object of the present invention is to stably provide a steel having a hot-dip aluminum alloy plated layer which has both excellent shear cut edge corrosion resistance and processed part corrosion resistance, does not corrode for a long period of time, and is versatile as a structural material.
HOT-DIP ALUMINUM ALLOY PLATED STEEL HAVING EXCELLENT SHEAR CUT EDGE CORROSION RESISTANCE AND PROCESSED PART CORROSION RESISTANCE, AND METHOD OF MANUFACTURING THE SAME

TECHNICAL FIELD

The present invention relates to a surface-treated steel having excellent corrosion resistance, particularly, an aluminum alloy plated steel having excellent shear cut edge corrosion resistance and processed part corrosion resistance, and a method of manufacturing the same.

This application is a national stage application of International Application No. PCT/JP2011/062448, filed May 31, 2011, which claims priority to Japanese Patent Application No. 2010-124933, filed May 31, 2010, and Japanese Patent Application No. 2010-133087, filed Jun. 10, 2010, the contents of which are incorporated herein by reference.

BACKGROUND ART

Hitherto, a Zn plated steel obtained by performing plating of a Zn-containing alloy on the surface of a steel has been used in wide fields of, such as automobiles, home appliances, and construction materials. However, since Zn has problems of rising prices, depleting resources, and the like, there is a demand for a plating metal that can replace Zn.

Meanwhile, Al is cheap and also has a rich amount of deposits. Due to excellent corrosion resistance and heat resistance, an aluminum plated steel sheet that is plated with aluminum, similarly to Zn plated steels, is widely used for home appliances, and construction and automobile structural materials.

However, the aluminum plated steel sheet has a problem of a relatively small sacrificial corrosion-preventing action. This is because Al has a characteristic of being easily passivated, particularly, in a dry environment, and the sacrificial corrosion-preventing performance is degraded due to generation of a passive film. Therefore, it has been difficult to replace a zinc plate having an excellent sacrificial corrosion-preventing performance with an aluminum plate of the related art.

In recent years, since there has been a strong demand for a highly corrosion-resistant steel in which corrosion (for example, perforation corrosion) does not occur over a long period of time (for example, for several years) even in a highly corrosive environment, a number of proposals have been made to enhance the corrosion resistance of a hot-dip aluminum alloy plated steel sheet (for example, refer to Patent Documents 1 to 4).

In the proposals, steel sheet compositions or plating bath compositions are devised, and the comprehensive corrosion resistance of a hot-dip aluminum plated steel sheet is improved. Meanwhile, recently, as a result of diversifying uses of hot-dip aluminum plated steel sheets, there have been increasing cases in which hot-dip aluminum plated steel sheets are used after being cut into a necessary shape or severely deformed. Therefore, there is a strong demand for an increase in shear cut edge corrosion resistance and processed part corrosion resistance, that is, improvement of the sacrificial corrosion-preventing performance.

Patent Document 5 discloses an Al plated steel sheet having excellent processed part corrosion resistance and end surface corrosion resistance. However, since the steel sheet includes expensive Zn in the plated layer, the steel sheet is disadvantageous in home appliances, and construction and automobile structural materials in terms of costs.

Patent Document 6 discloses a high-strength Al plated steel sheet having excellent processed part corrosion resistance, but quenching is essential after a pressing process, and versatility is lacking.

Patent Document 7 discloses an aluminum alloy plated steel containing Mg and Ca. However, in the disclosure, the method of attaching a plating layer to a steel is not limited to hot dipping, and no studies have been performed regarding stable manufacturing through industrially advantageous hot dipping.

RELATED ART DOCUMENTS

Patent Documents

[Patent Document 1] Japanese Unexamined Patent Application, First Publication No. S62-176021
[Patent Document 2] Japanese Unexamined Patent Application, First Publication No. H05-287492
[Patent Document 3] Japanese Unexamined Patent Application, First Publication No. H05-311379
[Patent Document 4] Japanese Unexamined Patent Application, First Publication No. 2004-250734
[Patent Document 5] Japanese Unexamined Patent Application, First Publication No. 2002-012959
[Patent Document 6] Japanese Unexamined Patent Application, First Publication No. 2004-244704
[Patent Document 7] Japanese Unexamined Patent Application, First Publication No. 2009-120942

DISCLOSURE OF THE INVENTION

Problems to be Solved by the Invention

In consideration of the limitations on the corrosion resistance of hot-dip aluminum plated steel sheets of the related art, an object of the present invention is to stably provide a steel having a hot-dip aluminum alloy plated layer which has both excellent shear cut edge corrosion resistance and processed part corrosion resistance, does not corrode for a long period of time, and is versatile as a structural material.

Means for Solving the Problems

The present inventors performed thorough studies regarding methods for enhancing both shear cut edge corrosion resistance and processed part corrosion resistance in steels for which an aluminum alloy is applied by hot-dipping.

It was found from the results of the studies that, when an Fe—Al alloy containing a necessary amount of Mg and Ca is applied on the surface of a steel by hot-dipping, the shear cut edge corrosion resistance and processed part corrosion resistance are improved, and red rust is not caused over a long period of time. Furthermore, it was found that, when the component range is restricted in a specific range, advantages are obtained mainly for the operability, such as plating bath stability and ease of stabilizing thermal treatments, during manufacturing of a hot-dipped plated steel. Furthermore, it was found that, in order to stably exhibit corrosion resistance, it is important that a majority of Mg in a plated layer does not form a solid solution in an Al phase, and transforms into an α-Mg phase or an $Al_3Mg_2$ phase.

The overview of the present invention is as follows:
(1) According to a first aspect of the present invention, there is provided a hot-dip aluminum alloy plated steel including a base steel and a plated layer, in which the composition of the plated layer contains, by % by mass, Fe: 25% to 75%, Mg: 2% to 20%, and Ca: 0.02% to 2% with a remainder of Al and inevitable impurities, the plated layer contains one or both of an α-Mg phase and an $Al_3Mg_2$ phase, and the sum of the partial volume fraction of the α-Mg phase and the partial volume fraction of the $Al_3Mg_2$ phase in a range of a depth of 5 μm from a surface of the plated layer is 1% to 40%.

(2) In the hot-dip aluminum alloy plated steel according to the above (1), the partial volume fraction of the α-Mg phase may be 0.4% to 20% in the plated layer.

(3) In the hot-dip aluminum alloy plated steel according to the above (1), the partial volume fraction of the $Al_3Mg_2$ phase may be 0.1% to 40% in the plated layer.

(4) In the hot-dip aluminum alloy plated steel according to the above (2), the amount of Fe contained in the composition of the plated layer may be 40% to 55%.

(5) In the hot-dip aluminum alloy plated steel according to the above (3), the amount of Fe contained in the composition of the plated layer may be 30% to 50%.

(6) In the hot-dip aluminum alloy plated steel according to any one of the above (1) to (5), the composition of the plated layer may further contain, by % by mass, at least one of Si: 0.0001% to 2%, REM: 0.0001% to 1%, and Sr: 0.0001% to 2%.

(7) In the hot-dip aluminum alloy plated steel according to the above (6), the REM may be an La—Ce alloy.

(8) According to a second aspect of the present invention, there is provided a hot-dip aluminum alloy plated steel in which coating is performed on the hot-dip aluminum alloy plated steel according to any one of the above (1) to (5).

(9) According to a third aspect of the present invention, there is provided a method of manufacturing the hot-dip aluminum alloy plated steel of the above (1), including a plating process in which the base steel is immersed in a plating bath; and an alloying thermal treatment process in which the base steel is held at a temperature of the melting point of the plating bath or higher, 500° C. or higher, and lower than 700° C. for a duration of more than 3 seconds and 60 seconds or less in a state in which the base steel is immersed in the plating bath or after the base steel is removed from the plating bath.

(10) According to a fourth aspect of the present invention, there is provided a method of manufacturing the hot-dip aluminum alloy plated steel of the above (2), including a plating process in which the base steel is immersed in a plating bath; and an alloying thermal treatment process in which the plated base steel is heated at a temperature of the melting point of the plating bath or higher, 500° C. or higher, and lower than 700° C. for a duration of more than 3 seconds and 60 seconds or less after the base steel is removed from the plating bath.

(11) According to a fifth aspect of the present invention, there is provided a method of manufacturing the hot-dip aluminum alloy plated steel of the above (3), including a plating process in which the base steel is immersed in a plating bath; and an alloying thermal treatment process in which the base steel is held at a temperature of the melting point of the plating bath or higher, 500° C. or higher, and lower than 700° C. for a duration of more than 3 seconds and 60 seconds or less in a state in which the base steel is immersed in the plating bath, in which no alloying thermal treatment is performed after the plated base steel is removed from the plating bath.

Effects of Invention

According to the present invention, it is possible to stably provide a steel having an aluminum alloy plated layer which has excellent corrosion resistance, particularly, both shear cut edge corrosion resistance and processed part corrosion resistance, and does not corrode for a long period of time even in a relatively dry environment or a highly humid and severely corrosive environment due to the effects of an α-Mg phase in a plate, and is versatile as a structural material.

EMBODIMENTS OF THE INVENTION

As a result of studies by the inventors, it was found that, in a plated steel of the related art, the long-term stability of a plating bath was not necessarily favorable or there were cases in which the corrosion resistance of a product was not sufficient due to instability during operation.

In addition, in the related art, no detailed studies were performed regarding the relationship between microstructures containing Mg in a plated layer and corrosion resistance. As a result, it became evident that shear cut edge corrosion resistance or processed part corrosion resistance cannot be stably obtained in a particularly dry environment or a particularly highly humid environment.

Therefore, the inventors thoroughly studied methods for enhancing both shear cut edge corrosion resistance and processed part corrosion resistance in a steel for which an aluminum alloy was hot dipped.

According to the results of the studies, it was found that, when an Fe—Al alloy containing a necessary amount of Mg and Ca is applied on the surface of a steel by hot-dipping, the shear cut edge corrosion resistance and the processed part corrosion resistance are improved, and red rust is not caused over a long period of time. Furthermore, it was found that, when the component range is restricted to a specific range, advantages are obtained mainly for the operability, such as plating bath stability and ease of alloying thermal treatments, during manufacturing of a hot-dipped plated steel. Furthermore, it was found that, in order to stably exhibit corrosion resistance in various environments, it is important that a majority of Mg in a plated layer does not form a solid solution in an Al phase, and transforms into an α-Mg phase or an $Al_3Mg_2$ phase.

Mg is a vital factor that directly contributes to corrosion resistance in the hot-dip aluminum alloy plated steel. However, for aluminum alloy plated steels of the related art, studies were not performed sufficiently regarding microstructures containing Mg in a plated layer. In addition, a method of controlling Mg-containing structures in a plated layer was also not disclosed. Meanwhile, main factors that contribute to corrosion resistance in a dry environment and a damp environment respectively are an α-Mg phase or an $Al_3Mg_2$ phase. Mg included in an Al layer in a solid solution form, which is another structure, cannot sufficiently contribute to corrosion resistance.

In addition, in the related art, an alloying heating treatment is performed at a relatively high temperature in order to introduce Fe to a plated layer. When the alloying heating treatment is performed at a high temperature, there is a tendency that a majority of the $Al_3Mg_2$ phase that is formed in a plated layer during plating is evaporated and lost. In addition, it was found that, when the alloying heating treatment is performed at a high temperature, a majority of the α-Mg phase is also evaporated and lost from the surface.

Therefore, in the present invention, a heating process during formation of a plate is strictly managed so as to control Mg-containing structures in the plated layer, and stably produce a hot-dip aluminum alloy plated steel having favorable corrosion resistance.

Hereinafter, embodiments of the present invention will be described in detail.

The hot-dip aluminum alloy plated steel of the present embodiment (the steel of the embodiment) is a hot-dip aluminum alloy plated steel having a base steel and a plated layer. The amount of the plated layer attached is not particularly limited, but is desirably 40 g/m² so as to form a thickness of approximately 20 μm. The composition of the plated layer contains, by % by mass, Fe: 25% to 75%, Mg: 2% to 20%, and Ca: 0.02% to 2% with a remainder of Al and inevitable impurities. The plated layer contains one or both of an α-Mg phase or an $Al_3Mg_2$ phase. The sum of the partial volume fraction of the α-Mg phase and the partial volume fraction of the $Al_3Mg_2$ phase in a range of a depth of 5 μm from a surface of the plated layer is 1% to 40%. The above configuration enables the steel to have excellent shear cut edge corrosion resistance and processed part corrosion resistance.

Hereinafter, reasons why the component composition of the plated layer is limited will be described. Meanwhile, % indicates % by mass.

In a hot dipping method, if the amount of Fe in the plated layer is set to less than 25%, it is necessary to shorten a plating immersion time, perform quenching after removing the steel from a plating bath, or add an alloying-suppressing component, such as Si, as a plating component. As a result, a variety of disadvantages are caused in operation conditions.

In addition, in a case in which the amount of Fe is lower than 25%, there are cases in which a portion including an extremely low concentration of Fe is locally formed in the top layer of the plate, and, also, there are cases in which corrosion resistance is deteriorated after coating. Therefore, the lower limit of the amount of Fe in the plated layer was set to 25% or more. The lower limit of the amount of Fe is desirably more than 25%, and more desirably 30% or more.

When the amount of Fe in the plated layer exceeds 75%, $Fe_3Al$ is generated, and the plated layer becomes brittle. As a result, more cracks reach the base steel, the plated layer breaks and peels off during processing, and therefore there are cases in which necessary corrosion resistance and processed part corrosion resistance cannot be obtained. Therefore, the upper limit of the amount of Fe was set to 75% or less. The upper limit of the amount of Fe is desirably 50% or less and more desirably less than 40%.

In order to introduce 55% or more of Fe to the plated layer, it is necessary to perform a thermal treatment for alloying at a high temperature or for a long time even in a case in which the alloying-suppressing element, such as Si, is not added, and non-economic operation conditions are thus required. In addition, in a case in which a thermal treatment is performed at a high temperature or for a long time, a brittle layer having a higher concentration of Fe than an average plated layer is likely to be generated in an interface between a base steel and the plate. Therefore, the concentration of Fe in the plated layer is desirably 55% or less.

Mg and Ca are added to enhance shear cut edge corrosion resistance and processed part corrosion resistance. From the viewpoint of bath stability, Mg is mainly added, and Ca is added to control oxidation of Mg in the plating bath. In the concentration range of Fe in the plated layer of the embodiment, when the amount of Mg is less than 2%, the effect of corrosion resistance improvement is not sufficient. Therefore, the lower limit of the amount of Mg is set to 2%. Desirably, the lower limit of the amount of Mg is 5% or more.

Meanwhile, in order to make the plated layer contain 20% or more of Mg, it is necessary to make the concentration of Mg in the plated bath extremely high particularly in a case in which Fe is introduced through a reaction with a steel sheet using a plating bath containing little Fe. This is because Fe is added to the plated layer through an alloying reaction, and therefore the concentration of Mg in a plated layer becomes relatively lower than the concentration of Mg in the plating bath.

Ca generates stable corrosion products, holds the immersion potential of the plate at a low level, and thus contributes to favorable shear cut edge corrosion resistance and processed part corrosion resistance. In addition, Ca suppresses oxidation of Mg in the plating bath, and stabilizes the plating bath. The lowest amount of Ca that is necessary for stabilization of the plating bath according to the amount of Mg is approximately 1% to 10% of the amount of Mg. Therefore, the content of Ca in the plated layer is set to 0.02% to 2%. When the amount of Ca exceeds 2%, the stability of the plating bath is frequently lost, and therefore the upper limit of the amount of Ca is set to 2% or less, and preferably 1.5% or less. In addition, the lower limit of the amount of Ca is desirably 0.1% or more, and more preferably 0.2% or more. Particularly, in order to stabilize the plating bath in consideration of the optimal concentration of Mg for the present application, the lower limit of the amount of Ca is still more preferably more than 1%.

In a case in which a thermal treatment for alloying is separately performed, and a sufficient concentration of Fe is obtained, the concentration of Mg in the plating bath needs to be, specifically, 40% or more in order to make the plated layer contain more than 20% of Mg, considering the amount of Mg gasified during the thermal treatment. At the above concentration of Mg, it becomes difficult to guarantee the stability of the plating bath. Therefore, the upper limit of the amount of Mg in the plated layer is set to 20%, and desirably 15% or less.

In the above content range of Mg, it is assumed that stable corrosion products are generated in a cycle corrosion test which is a stricter corrosion environment than a salt spray test, and favorable shear cut edge corrosion resistance and processed part corrosion resistance are achieved.

The form of Mg present in the plate in the plate composition range in the steel of the present invention is mainly three kinds of a solid solution in Al, an α-Mg phase, and an $Al_3Mg_2$ phase. Particularly, in order to improve the sacrificial corrosion-preventing performance so as to obtain a high degree of shear cut edge corrosion resistance and processed part corrosion resistance, it is effective to precipitate a large amount of the α-Mg phase. In addition, in order to hold the sacrificial corrosion-preventing performance for a long time in an environment in which the exposure time to damp is long and the humidity is high so as to obtain a high degree of shear cut edge corrosion resistance and processed part corrosion resistance, it is effective to precipitate a large amount of the $Al_3Mg_2$ phase.

Here, the α-Mg phase refers to an Mg-based metal having the same crystal structure as the structure of pure Mg at room temperature. As a peak of α-Mg that is identified by X-ray diffraction, No. 00-035-0821 is registered in a PDF database in the ICDD. Similarly, the $Al_3Mg_2$ phase is registered with No. 00-029-0048.

Since the α-Mg phase has a low immersion potential, the plated layer including the α-Mg phase has a favorable sacrificial corrosion-preventing performance, and, particularly, it becomes possible to realize a steel sheet having excellent initial corrosion prevention. The above characteristic also contributes to improvement of the corrosion-preventing performance in a particularly dry environment.

In addition, as a secondary effect, an Al-containing phase having a low melting point is decreased on the plate surface in which the α-Mg phase is formed, and therefore spot weldability improves.

The $Al_3Mg_2$ phase has a higher immersion potential than the α-Mg phase, but shows a lower immersion potential than a base steel, and thus has a sacrificial corrosion-preventing capability. Furthermore, since the $Al_3Mg_2$ phase is alloyed with Al to an appropriate extent, it is possible to retain corrosion resistance for a long period of time even in a damp environment and to maintain the sacrificial corrosion-preventing capability for a long period of time. Therefore, it becomes possible to realize a steel sheet having excellent long-term corrosion prevention. The above characteristic contributes particularly to a corrosion-preventing performance in a damp environment.

Formation of the α-Mg phase and the $Al_3Mg_2$ phase in the steel of the embodiment can be easily detected and identified by X-ray diffraction from the plate surface. Within the composition range of the embodiment, the (002) peak having a d value of 2.605 does not overlap with peaks of other phases formed and can be used as a single peak.

For example, in a case in which a sample cut into a size of 20 mm×20 mm having an attachment amount of 40 $g/m^2$ is measured using a commercially available X-ray diffraction apparatus and 40 kV-150 mA Cu—Kα rays as an X-ray source under conditions of the divergence slit and the scattering slit: 1 degree, the light-receiving slit: 0.15 mm, the monochromatic light-receiving slit: 0.8 mm, the scanning speed: 2 degrees/minute (continuous), the sampling interval: 0.01 degrees, and the diffraction angle 2θ: 33.8 degrees to 34.7 degrees, a peak in a range of 34.2 degrees to 34.5 degrees is obtained. When the ratio of "P: the peak intensity from which the background intensity is subtracted" to "B: the background intensity" is indicated by P/B ratio, it can be determined that α-Mg is detected when the P/B ratio detected is 1 or more through peak fitting.

In a case in which the α-Mg phase or the $Al_3Mg_2$ phase is not sufficiently formed, Mg forms solid solutions in an Al phase or an Al—Fe alloy layer. In a case in which the content of Mg is large, there are also cases in which both the α-Mg phase and the $Al_3Mg_2$ phase are formed. In order to obtain favorable shear cut edge anticorrosion properties or processed part corrosion resistance particularly in a dry environment in which a dry state remains for a long time through the favorable sacrificial corrosion-preventing performance, it is necessary to form a sufficient amount of the α-Mg phase. In addition, in order to obtain favorable shear cut edge anticorrosion properties or processed part corrosion resistance particularly in a damp environment in which a highly humid state remains for a long time through the long-term sacrificial corrosion-preventing performance, it is necessary to form a sufficient amount of the $Al_3Mg_2$ phase.

In the composition range of the embodiment, a (880) peak having a d value of 2.496 is useful as a single peak for detection of the $Al_3Mg_2$ phase. In a case in which Cu—Kα rays are used, similarly to the α-Mg, the peak intensities of peaks can be obtained through fitting of the single peak when a measurement is made in a range of the diffraction range 2θ of 35.6 degrees of 36.3 degrees.

The intensities of the respective peaks can be obtained by performing convenient measurements of X-ray diffraction under the above conditions and performing data fitting on measurement results using the above analysis results. The peak intensities are compared to the (200) diffraction ray intensities of the Al phase, which are measured in the same manner, so that the volume fraction of the α-Mg phase and the volume fraction of the $Al_3Mg_2$ phase can be estimated according to the following sequence.

Firstly, a plurality of standard data of Al alloys is prepared, and the volume fractions of the α-Mg phase and the $Al_3Mg_2$ phase are respectively obtained through EDS. Next, measurements of X-ray diffraction are performed using the same standard data so as to obtain the diffraction ray intensity ratios of α-Mg phase/Al phase and $Al_3Mg_2$ phase/Al phase. A standard curve is drawn for the standard data from the volume fraction by EDS and the diffraction ray intensity ratios of α-Mg phase/Al phase and $Al_3Mg_2$ phase/Al phase. Only measurements of X-ray diffraction are performed on the test data, and the diffraction intensity ratios of the respective specimens and the standard curve are compared, thereby allowing computation of the volume fractions of the respective phases.

Meanwhile, there are cases in which the crystal orientations of the α-Mg phase and the $Al_3Mg_2$ phase are somewhat oriented; however, in a case in which sufficient amounts of the α-Mg phase and the $Al_3Mg_2$ phase are generated, detection by the single peak is possible only with the in-plane rotation and the like of samples.

In a case in which a measurement is made by the above method in which X-ray diffraction is used, the volume fractions of the α-Mg phase and the $Al_3Mg_2$ phase in an area from the surface of the plated steel sheet to a depth of approximately 5 μm can be measured by adjusting conditions, such as the output of the ray source.

When the sum of the volume fractions of the α-Mg phase and the $Al_3Mg_2$ phase is 1% or more, a plated layer having a favorable corrosion-preventing performance is obtained. The upper limit of the sum of the volume fractions of the α-Mg phase and the $Al_3Mg_2$ phase obtained in the plated layer obtained under the above conditions is approximately 40%. In a case in which there is a demand for a more favorable corrosion-preventing performance, the sum of the volume fractions is preferably 3% or more, and more desirably 5% or more, or 7% or more.

Particularly in a case in which there is a demand for a favorable sacrificial corrosion-preventing performance in a dry environment, the volume fraction of the α-Mg phase is desirably 0.4% to 20%.

Meanwhile, particularly in a case in which there is a demand for a favorable sacrificial corrosion-preventing performance in a damp environment, the volume fraction of the $Al_3Mg_2$ phase is desirably 0.1% to 40%.

The plated layer of the embodiment, additionally, can contain at least one of Si: 0.02% to 2% and REM (Rare Earth Metal) 0.02% to 1%.

When Si and/or REM are present in the plated layer, corrosion resistance, particularly shear cut edge corrosion resistance and processed part corrosion resistance are further improved, and an improvement effect is also observed for bare corrosion resistance or corrosion resistance after coating. Since the corrosion resistance improvement effect does not develop when any of the components is less than 0.02%, each of the lower limits of the amounts of Si and REM is set to 0.02%.

Meanwhile, when a large amount of Si is present in the plated layer, the Si serves to suppress alloying of Al—Fe—Mg—Ca. As a result, it becomes necessary to increase a heating temperature necessary for the alloying or maintain heating for a long time. Therefore, the upper limit of the amount of Si is set to 2%.

In addition, even when the amount of REM in the plated layer is increased to more than 1%, the shear cut edge corrosion resistance and the processed part corrosion resistance are not improved in accordance with the increase of the amount, and become saturated. Therefore, the upper limit of the amount of REM is set to 1%.

As the REM, an La—Ce alloy that is industrially cheap and can be added to a plating bath as a misch metal is preferred. Examples of other REM that can be used as a material added include Sc, Y, Pr, Nd, Pm, Sm, Eu, Gd, Tb, Dy, Ho, Er, Tm, Yb, Lu, and the like since a corrosion resistance improvement effect develops.

In order to maintain favorable surface properties during manufacturing, Sr may be added as a plating component of the embodiment. When the amount of Sr is less than 0.003%, the effect is not obtained, and, when the amount of Sr exceeds 2%, generation of dross becomes significant. Therefore, in a case in which Sr is added, the amount is set in a range of 0.003% to 2%. The effect of addition of Sr becomes effective when a large amount of Mg is added. In addition, Sr secondarily contributes particularly to corrosion resistance after coating through improvement of surface properties.

In the embodiment, since the plated layer having the above composition bears excellent shear cut edge corrosion resistance and processed part corrosion resistance, the base steel is not limited to a specific steel. As the base steel, any of a hot-rolled material and a cold-rolled material can be used. In addition, as the base steel, common steels such as a low-carbon steel, a high-strength steel containing large amounts of Si, Mn, and Al, a stainless steel, and an electromagnetic steel can be used. In addition, the shape of the steel may be any of a steel sheet, a steel pipe, a structural material, and a wire rod.

The plating method is preferably the hot dipping method from an industrial viewpoint.

Meanwhile, in the preceding process of plating, it is preferable that the steel be degreased using an alkali, and a pretreatment that activates the surface of the steel be performed by any method of a non-oxidation furnace-reduction furnace method, a full reduction furnace method, a flux method, sand blasting, shot blasting, and the like.

In the hot dipping method, the plated layer is made to contain Fe by directly adding Fe to an Al—Mg—Ca alloy hot dipping bath, or performing an alloying treatment. In the alloying treatment, a steel which is used as the base steel is immersed in an Al—Mg—Ca alloy hot dipping bath including little Fe, an Al—Mg—Ca plate is attached, and Fe is introduced to the plated layer from the base steel during the immersion or through a thermal treatment after plating. Hereinafter, this process will be referred to as "alloying."

When a large amount of Fe is contained in the plating bath in an operation of a hot dipping process, the melting point of the plating bath increases, and therefore it becomes necessary to perform the operation at a high temperature. Therefore, most of Fe is desirably introduced by the latter method of alloying. In addition, particularly in the case in which the plating components contain no Si or only a small amount of Si, since the temperature of the plating bath is relatively high, and the reactivity of Al with Fe is high, it is also possible to obtain a concentration of Fe of 25% or more through a reaction in the bath only.

Specifically, the non-pretreated steel or pretreated steel is immersed for a duration of more than 3 seconds and 60 seconds or less in an Al—Mg—Ca—(Fe) alloy-plating bath having a necessary concentration of Fe and concentrations of Mg and Ca or an Al—Mg—Ca alloy-plating bath including little Fe and having necessary concentrations of Mg and Ca. Thereby, an Al—Fe—Mg—Ca alloy plated layer having a necessary thickness is formed on the surface of the steel.

In a case in which the Al—Mg—Ca alloy-plating bath including little Fe is used, the temperature of the bath is preferably 500° C. to lower than 700° C. At this temperature, the plated layer is alloyed, and an Al—Fe—Mg—Ca alloy plated layer is generated. In addition, formation of an Al—Fe—Mg—Ca alloy layer may be promoted by removing the steel from the plating bath, and then heating the plated layer (refer to alloying heating as described below).

When Mg and Ca are added to the bath, the components can be adjusted while the stability of the bath is maintained by repeating a sequence of adding Mg first, adding Ca amounting to approximately 10% of Mg each time several % of Mg is added, stirring Mg and Ca well, and then adding several % of Mg.

In addition, a method in which a eutectic alloy of Mg or Ca and Al is added to the plating bath at a possible low temperature may be employed. This method is effective for suppressing oxidation of added metals and maintaining bath stability. However, even in this case, Mg and Ca should be alternately added every several %, and it is preferable to avoid, even temporarily, producing a plating bath having only one of Mg and Ca dissolved at a high concentration.

In addition, in order to obtain an amount of Mg in the bath of more than 20%, it is necessary to include Mg in the plating bath at a concentration higher than the final concentration particularly in a case in which Fe is introduced by a reaction with the steel sheet using the plating bath containing little Fe. That is, this is because Fe is added to the plated layer through an alloying reaction after the immersion, and therefore the concentration of Mg in the plated layer becomes lower than the concentration of Mg in the plating bath.

In a case in which a thermal treatment for alloying is separately performed so as to obtain a sufficient concentration of Fe, a certain amount of Mg is gasified and lost during the thermal treatment. Therefore, in order to include 20% of Mg in the plated layer, the concentration of Mg in the plating bath needs to be, specifically, approximately 40%.

Similarly, in a case in which a thermal treatment for alloying is separately performed, the initial concentration of Ca in the plating bath also needs to be approximately double or more the final concentration in the target plate.

In the steel of the embodiment, it is necessary to precipitate the added Mg mainly as the α-Mg phase and the $Al_3Mg_2$ phase. Of the α-Mg phase and the $Al_3Mg_2$ phase, in order to obtain more $Al_3Mg_2$, the steel is immersed in the plating bath, then, removed from the plating bath or subjected to gas wiping immediately after removing so as to remove an excessive amount of attachment, and a molten plate is solidified and attached, thereby forming an Al—Fe—Mg—Ca alloy-based plated layer having a necessary thickness on the surface of the steel. In this case, a thermal treatment is not performed outside the bath.

Meanwhile, in order to obtain a larger amount of the α-Mg phase, for example, it is preferable that the steel be removed while a reaction between the base steel and the plated layer remains uncompleted in the bath, and a reaction for obtaining a desired concentration of Fe be caused by an additional thermal treatment performed outside the bath (hereinafter referred to as the alloying heating).

This is because, when a thermal treatment is performed on the plated layer attached at a composition similar to the bath components outside the plating bath, Al in the components predominantly reacts with Fe, and Mg that forms solid solutions in Al or Mg that is present in the $Al_3Mg_2$ phase is precipitated as the α-Mg phase.

However, when the temperature of the alloying treatment becomes 700° C. or higher in terms of the achieved temperature of the steel sheet (in the present specification, the alloying thermal treatment temperature refers to the above temperature), since particularly the α-Mg phase in the surface is evaporated and lost, there are many cases in which the Mg phase is not sufficiently obtained. Therefore, the temperature of the alloying heating is preferably lower than 700° C., and more desirably lower than 650° C. at which the steel of the embodiment can be manufactured stably at low cost with a favorable yield from the viewpoint of manufacturability, bath stability, and the yield of Mg.

The lower limit of the alloying thermal treatment temperature is generally the melting point of the bath components being attached or higher. This is because the alloying reaction rate significantly decreases at a temperature lower than the melting point of the attached plate component. However, when alloying proceeds, the plate components at non-alloyed portions change.

During the plating of the embodiment, due to the component system in which the melting points of non-alloyed portions increase as the alloying proceeds, generally, it becomes necessary to perform the alloying thermal treatment at a temperature higher than the melting point of the plating bath in order to obtain desired components after completion of the alloying. In the component range of the embodiment, the alloying thermal treatment temperature needs to be at lowest 500° C. or higher and desirably 550° C. or higher.

The steel of the embodiment has excellent corrosion resistance, particularly, shear cut edge corrosion resistance and processed part corrosion resistance, thus exhibiting a sufficient corrosion-resisting performance in bare use, and can extend the service life of a product by being coated. Since the steel of the embodiment has a particularly excellent sacrificial corrosion-preventing capability in a dry environment particularly compared with the Al plated steel of the related art, a capability of suppressing red rust at flaws caused in the coating is excellent, and, consequently, the progress of coated layer swollenness can be suppressed.

The coating material being coated is not limited to a specific coating material. A polyester resin, an amino resin, an epoxy resin, an acryl resin, a urethane resin, a fluororesin, and the like can be used. The coating method that can be used includes, for example, a roll coater, a bar coater, spraying, curtain flowing, and electrode deposition, and is not limited to a specific coating method.

In addition, a chromate-free chemical conversion treatment, a chromate-containing chemical conversion treatment, a zinc phosphate-containing chemical conversion treatment, or the like may be performed according to necessity as a coating ground treatment.

EXAMPLES

Next, examples of the present invention will be described, and conditions in the examples are one example of conditions employed to confirm the feasibility and effects of the present invention; however, the present invention is not limited to the conditions of examples. The present invention can employ a variety of conditions within the purport of the present invention as long as the object of the present invention is achieved.

(Manufacturing of a Plated Steel)

A 0.8 mm-thick low carbon aluminum killed cold-rolled steel sheet, a 10 mm-thick equal leg angle steel having a side length of 10 cm, and a 10 mm-thick hot-rolled steel sheet were used as base steels, and surface-treated steels having an alloy plated layer as shown in Table 1 were manufactured.

For an Al alloy plating bath that was used to manufacture plates of the steels of the examples, an Al—Mg—Ca bath produced by adding 3% to 40% of Mg and 0.05% to 5% of Ca to pure Al was used as a basic solution, and other necessary component elements (Si and REM) were added according to necessity, thereby adjusting the bath composition.

The cold-rolled steel sheet was reduced at 800° C. in a $N_2$-15% $H_2$ atmosphere, and annealed. Next, a steel sheet was immersed in a plating bath, a temperature of which was set to the melting point of the plating bath+40 degrees, for 0.3 seconds to 3 seconds. After the steel sheet was removed, the amount of a plate attached was adjusted to 40 g/m² for a single surface through air wiping.

After the air wiping, the steels of the examples were subjected to alloying heating for 2.8 seconds to 6 seconds in a range of 500° C. to 690° C. for the steels of the examples and in a range of 440° C. to 720° C. for the steels of comparative examples. After that, the steels were immediately cooled using nitrogen gas so as to form a plated layer on the surfaces of the steel sheets. Some steels were manufactured as comparative materials by changing the temperature of the plating bath or conditions of the alloying heating, or not performing the alloying heating.

The equal leg angle steel was cut every 10 cm in the longitudinal direction, and the hot-rolled steel sheet was cut into squares of 10 cm×10 cm, thereby manufacturing specimens. Dipping plating by the flux method was performed on the specimens using a crucible furnace. The amount of a plate attached was adjusted by adjusting the immersion time and the removing speed. The alloying heating treatment was performed separately using an induction-heating furnace.

Steel sheets that were manufactured under all the satisfactory conditions of a temperature of the plating bath of lower than 650° C., an alloying heating temperature of lower than 650° C., and, furthermore, an alloying heating time of less than 30 seconds were determined to have favorable manufacturability, and denoted with an evaluation of "A" in the manufacturability column in Table 2.

Steel sheets that were manufactured under conditions of a high melting temperature of the plating bath, a temperature of the plating bath of 650° C. or higher, an alloying heating temperature of 650° C., or, furthermore, an alloying heating time of 30 seconds or more were determined to be manufacturable with an average degree of effort, and denoted with an evaluation of "B" in the manufacturing column in Table 2.

In addition, steel sheets that were manufactured under conditions of an alloying heating temperature of 700° C. or higher, a necessary alloying heating time of 60 seconds or more, or a necessary immersion time of 0.5 seconds or less were determined to be difficult to be manufactured, and denoted with an evaluation of "C" in the manufacturing column in Table 2.

In a case in which dross-outs, such as oxides, were caused, and a change of 1% or more was caused in the bath composition as a result of placing the plating bath idle at the plating temperature for 24 hours in the atmosphere, steel sheets were determined to be difficult to be manufactured, and denoted with an evaluation of "D" in the manufacturing column in Table 2.

(Analyses of the Plated Layers in the Manufactured Plated Steels)

The results of chemical analyses on the plated layers are shown in Table 2.

In order to confirm the precipitated phase of Mg in the plated layer, X-ray diffraction measurements were made by the θ-2θ method on the samples that were cut into a size of 20 mm×20 mm.

Measurements with a diffraction angle 2θ of 30 degrees to 40 degrees were made using a RINT 1500 system, manufactured by Rigaku Corp., and 40 kV-150 mA Cu—Kα rays as an X-ray source under conditions of a divergence slit=a scattering slit=1 degree, a light-receiving slit=0.15 mm, a monochromatic light-receiving slit=0.8 mm, a scanning speed: 2 degrees/minute (continuous) at 2θ, and a sampling interval of 0.01 degrees. The samples were rotated in the surfaces so as to suppress the influences of the orientation of the crystal orientation.

For detection of a (002) peak of an α-Mg phase, raw data having a diffraction angle 2θ in a range of 33.8 degrees to 34.7 degrees were used, and, for detection of a (880) peak of an $Al_3Mg_2$ phase, raw data having a diffraction angle 2θ in a range of 35.6 degrees to 36.3 degrees were used. Base on the above data, peak fitting was performed using a Gaussian function having a convenient single peak. The used function is shown in Formula 1.

$$I = BG + Ip \times \exp(-(T2-Tx)^2/Tw^2) \quad \text{(Formula 1)}$$

Herein, I represents the detection intensity of X-ray diffraction measurement (KCPS), T2 represents the diffraction angle (2θ, °), and the above two sets of data were used as the raw data, thereby obtaining fitting parameters as described below.

BG represents the background intensity (KCPS), Ip represent the peak intensity (KCPS), Tx represents the peak center angle) (°), Tw represents an integer (°) that is proportionate with a half-value width, and these four values serve as the fitting parameters. The P/B ratio was computed using Ip/BG that was obtained through fitting.

For steel sheets for which fitting did not originally converge or steel sheets for which the results of fitting showed that fitting converged to an abnormal value, such as negative peak intensities, half-value widths of a peak of 0.5 degrees or more, negative background, and background that doubled or more the data at both ends of the fitting angle range, graph shapes were also checked, and the peak intensities were considered to be insignificant so that the peak intensities were determined to be zero.

Figure 1:
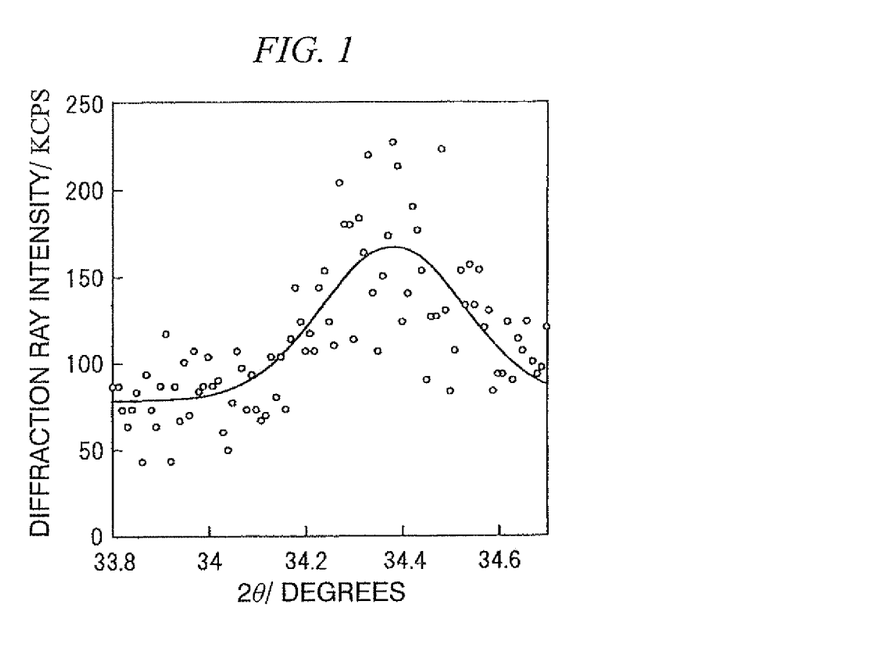
FIG. 1 is a view showing an analysis example for detecting the (002) peak of an α-Mg phase in Sample No. 20, where the respective circular plots indicate the raw data of the diffraction line intensities of Sample No. 20, and the solid line shows fitted results.

FIG. 1 is an example of interpretation for detecting the (002) peak of the α-Mg phase of Sample No. 20. The Ip and the BG are fitted to 88.6 and 78.6 respectively, and the P/B ratio is 1.13. The graph shows that the fitting curve follows the center of data distribution, and the peak intensities are significantly detected with respect to the BG intensities so that the (002) peak of the α-Mg phase was determined to be detected.

Figure 2:
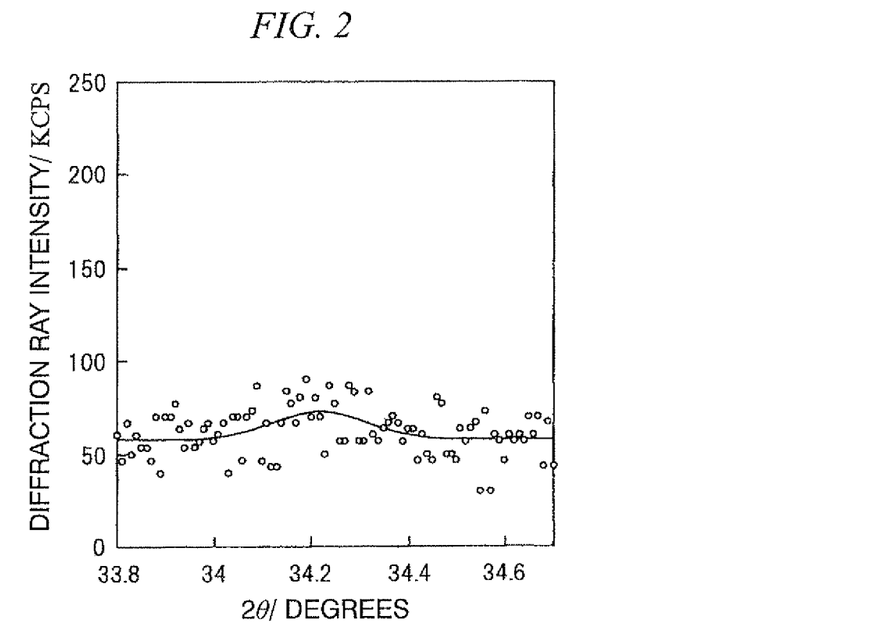
FIG. 2 is a view showing an analysis example for detecting the (002) peak of an α-Mg phase in Sample No. 40, where the respective circular plots indicate the raw data of the diffraction line intensities of Sample No. 40, and the solid line shows fitted results.

FIG. 2 is an example of interpretation for detecting the (002) peak of the α-Mg phase of Sample No. 54. The Ip and the BG were fitted to 15.2 and 57.6 respectively, and the P/B ratio was 0.26 and 1 or less. The graph shows that the fitting curve follows the center of data distribution, but the peak intensities are not sufficient, and lost in noise. In such a case, it was considered that detection of the (002) peak of the α-Mg phase could not be made sufficiently. Therefore, in the case of No. 54, formation conditions of the Mg phase were determined to be insufficient.

Figure 3:
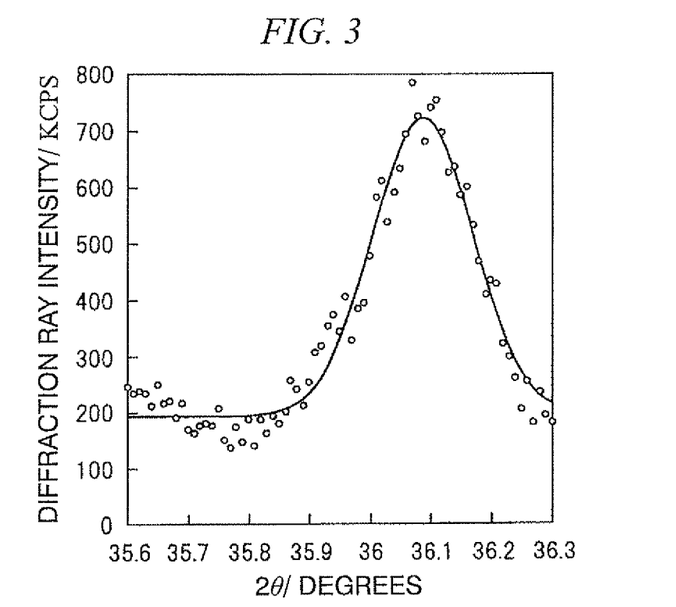
FIG. 3 is a view showing an analysis example for detecting the (880) peak of an $Al_3Mg_2$ phase in Sample No. 40, where the respective circular plots indicate the raw data of the diffraction line intensities of Sample No. 40, and the solid line shows fitted results.

FIG. 3 is an example of interpretation for detecting the (880) peak of the $Al_3Mg_2$ phase of Sample No. 54. The Ip and the BG are fitted to 529 and 193 respectively, the P/B ratio is 2.74, and detection is evident. The (880) peak intensity of the $Al_3Mg_2$ phase in this case was considered to be 529, compared to the peak intensity of the Mg phase, and whether or not the formation conditions of the Mg phase were sufficient was determined.

Figure 4:
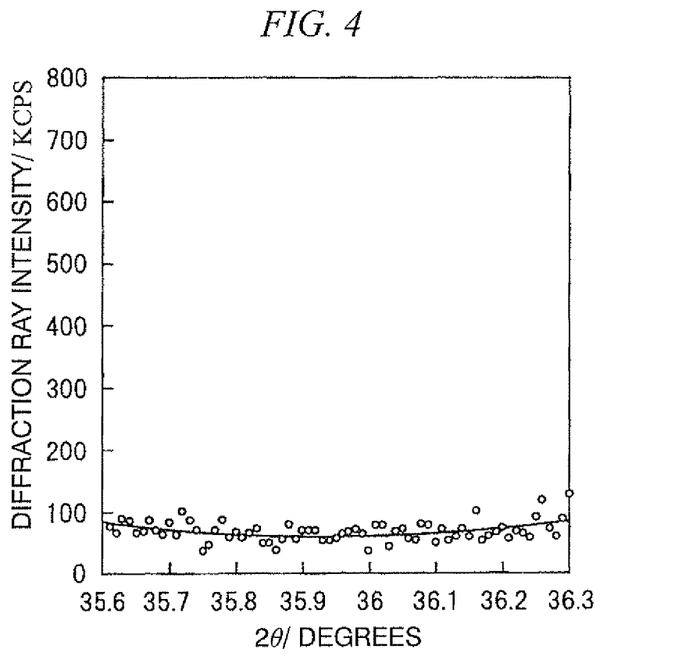
FIG. 4 is a view showing an analysis example for detecting the (880) peak of an $Al_3Mg_2$ phase in Sample No. 20, where the respective circular plots indicate the raw data of the diffraction line intensities of Sample No. 20, and the solid line shows fitted results.

FIG. 4 is an example of interpretation for detecting the (880) peak of the $Al_3Mg_2$ phase of Sample No. 20. The Ip and the BG were fitted to −167 and 226 respectively. The Ip becomes a negative value, and the BG is also different from visually expected values of 100 or less estimated on the graph. As is found from the graph, this case is an example in which fitting converges to an abnormal value since significant peaks are not detected compared to the noise level.

(Method of Measuring the Volume Fractions of the α-Mg Phase and the $al_3Mg_2$ Phase)

In a method of measuring the volume fractions, ratios of the (002) diffraction ray intensities of the α-Mg phase and the (880) diffraction ray intensities of the $Al_3Mg_2$ phase to the (200) diffraction ray intensity of the Al phase were obtained for the respective specimens being measured using an X-ray diffractometer. The volume fractions were computed by drawing a standard curve from the analysis results by EDS and the diffraction ray intensity ratios of α-Mg phase/Al phase and $Al_3Mg_2$ phase/Al phase regarding Al alloys having known volume fractions of the α-Mg phase and the $Al_3Mg_2$ phase, and comparing the diffraction ray intensity ratios of the respective specimens to the standard curve.

(Shear Cut Edge Corrosion Resistance Test)

Specimens having dimensions of 150 mm×70 mm were cut from the steel sheets having a plated layer. The specimens were subjected to spraying tests, in which the salt water of the methods of salt spray testing (JIS-Z2371) was changed to 0.5%, for one hour per day while the shear cut edges of the longitudinal portions were exposed, placed at a temperature of 35° C. and a humidity of 40% for the other hours, and subjected to dry and humid repetition tests for 40 days. After the tests, red rust-generated areas on the shear cut edges of the specimens were measured. The end surface red rust-generated areas with respect to the exposed areas of the shear cut edges were evaluated as the end surface red rust occurrence rate.

Evaluation was performed with five degrees of evaluation standard (evaluation score) set as shown below, and evaluation scores of three or more were determined to be a pass. The results are shown in Table 2.

Evaluation scores: end surface red rust occurrence rate
5: less than 5%
4: 5% to less than 10%
3: 10% to less than 20%
2: 20% to less than 30%
1: 30% or more The end surface red rust occurrence rates as shown in Table 2 show that the steels of the examples have excellent shear cut edge corrosion resistance particularly in dry tests in which the sacrificial corrosion-preventing performance does not easily work.

(Processed Part Corrosion Resistance Tests)

Specimens having dimensions of 50 mm×50 mm were cut from the plated steel sheets obtained in Example 1, and bent at 180 degrees, thereby manufacturing test specimens.

The test specimens were subjected to spraying tests, in which the salt water of the methods of salt spray testing (JIS-Z2371) was changed to 0.5%, for one hour per day, placed at a temperature of 35° C. and a humidity of 40% for the other hours, subjected to dry and humid repetition tests for 60 days, and red rust-generated areas on processed parts were measured. The red rust-generated areas with respect to the processed part areas were evaluated as the processed part red rust occurrence rate.

Evaluation was performed with five degrees of evaluation standard (evaluation score) set as shown below, and evaluation scores of three or more were determined to be a pass. The results are shown in Table 2. The processed part corrosion resistance tests were not performed on the equal leg angle steels and the hot-rolled sheets, and the evaluation fields were recorded as "-."

Evaluation score: processed part red rust occurrence rate
5: less than 5%
4: 5% to less than 10%
3: 10% to less than 20%
2: 20% to less than 30%
1: 30% or more The processed part red rust occurrence rates as shown in Table 2 show that the steels of the examples have excellent processed part corrosion resistance particularly in dry tests in which the sacrificial corrosion-preventing performance does not easily work.

(Tests of Corrosion Resistance after Coating)

After 2 g/m² of a chemical conversion layer containing no $Cr^{6+}$ was applied on the surface of the plated layer that was obtained in Example 1, an epoxy-modified polyester dye (manufactured by Nippon Paint Co., Ltd., P-02) was coated as a primer using a bar coater, and the plated layer was baked at a sheet temperature of 200° C. in a hot air drying furnace, thereby forming a 5 μm-thick coat.

Furthermore, a polyester dye (manufactured by Nippon Paint Co., Ltd., NSC-300HQ) was coated and baked at a sheet temperature of 220° C. in a hot air drying furnace, thereby forming a 20 μm-thick coat.

Specimens having dimensions of 150 mm×70 mm were cut out, and a 70 mm-long linear cut flaw was made on the surfaces of the specimens using a cutter knife. Ninety cycles of a cycle corrosion test (based on SAE J2334) were performed on the specimens, and the maximum values of the coating swollen width from the flaw were measured after the tests.

Evaluation was performed with five degrees of evaluation standard (evaluation score) set as shown below, and evaluation scores of three or more were determined to be a pass. The results are shown in Table 2.

Evaluation score: coating swollen width
5: less than 1 mm
4: 1 mm to less than 2 mm
3: 2 mm to less than 5 mm
2: 5 mm to less than 10 mm
1: 10 mm or more The coating swollen widths as shown in Table 2 show that the steels of the examples have excellent corrosion resistance after coating.

(Spot Weldability Tests)

Spot welding tests were performed on samples having a 0.8 mm cold-rolled steel sheet as the base steel under the following welding conditions by investigating the number of continuous dots during spot welding. A Cu—Cr electrode having a front end diameter of 4.5 mmφ, a front end angle of 120 degrees, and an outer diameter of 13 mmφ was used. 10 cycles of an electric current were made to flow using a 50 Hz power supply. Pressurization was made with a welding pressure of 1.7 kN with no up-and-down slope 30 cycles before the flow of an electric current and 10 cycles after the flow of an electric current.

Meanwhile, as the welding current value in the continuous dot investigation, the maximum number of dots for which a nugget diameter of 3.6 mm was maintained was obtained using the average values of an electric current value $I_1$ (kA) and a welding current value $I_2$ (kA) at which a nugget diameter of 3.6 mm or more was obtained.

Samples for which the number of continuous dots obtained was 2000 or more were given "A" which indicates particularly excellent spot weldability, samples for which the number of continuous dots obtained did not reach 2000, but was 1000 or more were given "B," and samples for which the number of continuous dots obtained did not reach 1000 were given "D."

The evaluation results of the respective tests are shown in Table 2. The spot welding tests were not performed on the equal leg angle steels and the hot-rolled sheets, and the evaluation fields were recorded as "-."

TABLE 1

| No. | Base steel | Bath temp. (° C.) | Immersion time (seconds) | Temp. of alloying outside bath (° C.) | Composition of the alloy plated layer (mass %) | | | | | | |
|---|---|---|---|---|---|---|---|---|---|---|---|
| | | | | | Fe | Mg | Ca | Si | REM La, Ce | Sr | |
| 1 | Cold- | 680 | 3 | 680 | 25 | 2 | 0.02 | | | | Examples |
| 2 | rolled | 670 | 4 | 670 | 25 | 5 | 0.3 | | | | |
| 3 | steel | 660 | 5 | 660 | 25 | 7 | 0.4 | | | | |
| 4 | sheet | 640 | 6 | 650 | 25 | 12 | 0.05 | | | | |
| 5 | | 620 | 3 | 630 | 25 | 15 | 0.5 | | | | |
| 6 | | 580 | 3 | 610 | 25 | 20 | 0.25 | | | 0.01 | |
| 7 | | 680 | 4 | 690 | 30 | 2 | 0.1 | | | | |
| 8 | | 670 | 5 | 670 | 30 | 5 | 0.3 | | | | |
| 9 | | 660 | 6 | 670 | 30 | 7 | 0.4 | | | | |
| 10 | | 640 | 3 | 650 | 30 | 12 | 0.05 | | | | |
| 11 | | 620 | 4 | 650 | 30 | 15 | 0.5 | | | 0.01 | |
| 12 | | 580 | 5 | 660 | 30 | 20 | 0.25 | | | | |
| 13 | | 680 | 5 | 680 | 40 | 2 | 0.02 | | | | |
| 14 | | 670 | 5 | 640 | 42 | 5 | 0.3 | | | | |
| 15 | | 660 | 5 | 650 | 40 | 7 | 0.4 | | | | |

TABLE 1-continued

| No. | Base steel | Bath temp. (°C.) | Immersion time (seconds) | Temp. of alloying outside bath (°C.) | Fe | Mg | Ca | Si | REM | La, Ce | Sr | |
|---|---|---|---|---|---|---|---|---|---|---|---|---|
| 16 | | 640 | 5 | 660 | 44 | 12 | 0.05 | | | | 0.01 | |
| 17 | | 620 | 5 | 650 | 40 | 15 | 0.5 | | | | | |
| 18 | | 580 | 5 | 670 | 40 | 20 | 0.25 | | | | | |
| 19 | | 680 | 4 | 690 | 46 | 2 | 0.02 | 0.2 | | | | |
| 20 | | 670 | 5 | 680 | 46 | 6 | 0.4 | | | | | |
| 21 | | 670 | 3 | 640 | 40 | 5 | 0.3 | | 0.05(Sc) | | | |
| 22 | | 660 | 3 | 660 | 48 | 7 | 0.4 | 0.2 | 0.1(Y) | | | |
| 23 | | 660 | 4 | 680 | 50 | 7 | 0.4 | | | | | |
| 24 | | 640 | 5 | 690 | 40 | 12 | 0.3 | | 0.05(Nd) | | | |
| 25 | | 620 | 3 | 650 | 50 | 15 | 0.5 | 1.8 | 0.05(Sm + Nd) | | 0.01 | |
| 26 | | 600 | 3 | 640 | 40 | 20 | 0.25 | 0.5 | | | | |
| 27 | | 670 | 4 | 670 | 45 | 5 | 0.3 | 0.2 | | 0.03 | | |
| 28 | | 670 | 5 | 680 | 45 | 5 | 0.3 | 0.5 | 0.1(Y) | 0.1 | | |
| 29 | | 670 | 3 | 670 | 45 | 5 | 0.3 | 1.5 | | 0.1 | | |
| 30 | | 660 | 3 | 660 | 45 | 7 | 0.4 | 1.5 | | 0.03 | | |
| 31 | | 660 | 4 | 660 | 45 | 7 | 0.4 | 0.5 | 0.1(Sm + Nd) | 0.1 | | |
| 32 | | 660 | 5 | 690 | 45 | 7 | 0.4 | 0.2 | | 0.5 | 0.01 | |
| 33 | | 670 | 6 | 680 | 55 | 2 | 0.02 | | | | | |
| 34 | | 660 | 3 | 690 | 58 | 7 | 0.5 | | | | | |
| 35 | | 660 | 4 | 670 | 70 | 7 | 0.5 | | | | | |
| 36 | A | 650 | 5 | 650 | 43 | 9 | 0.4 | | | | | |
| 37 | A | 670 | 6 | 670 | 48 | 5 | 0.2 | 0.5 | | 0.1 | | |
| 38 | B | 650 | 3 | 650 | 45 | 8 | 0.4 | 0.4 | 0.1(Y) | 0.1 | | |
| 39 | B | 670 | 4 | 670 | 48 | 4 | 0.2 | | | | | |
| 40 | Cold- | 680 | 5 | — | 25 | 2 | 0.02 | | | | | |
| 41 | rolled | 670 | 3 | — | 25 | 5 | 0.3 | | | | | |
| 42 | steel | 660 | 4 | — | 25 | 7 | 0.4 | | | | | |
| 43 | sheet | 640 | 5 | — | 25 | 12 | 0.05 | | | | | |
| 44 | | 620 | 6 | — | 25 | 15 | 0.5 | | | | | |
| 45 | | 580 | 3 | — | 25 | 20 | 0.25 | | | | 0.01 | |
| 46 | | 680 | 4 | — | 30 | 2 | 0.1 | | | | | |
| 47 | | 670 | 5 | — | 30 | 5 | 0.3 | | | | | |
| 48 | | 660 | 6 | — | 30 | 7 | 0.4 | | | | | |
| 49 | | 640 | 3 | — | 30 | 12 | 0.05 | | | | | |
| 50 | | 620 | 4 | — | 30 | 15 | 0.5 | | | | 0.01 | |
| 51 | | 580 | 5 | — | 30 | 20 | 0.25 | | | | | |
| 52 | | 670 | 3 | — | 35 | 3 | 0.02 | | | | | |
| 53 | | 670 | 4 | — | 39 | 6 | 0.3 | | | | | |
| 54 | | 650 | 3 | 500 | 37 | 7 | 0.4 | | | | | |
| 55 | | 660 | 4 | 530 | 40 | 5 | 0.4 | | | | | |
| 56 | | 670 | 5 | 550 | 45 | 4 | 0.3 | | | | | |
| 57 | | 670 | 6 | 570 | 50 | 3 | 0.3 | | | | | |
| 58 | Cold- | 650 | 3 | 440 | 10 | 7 | 0.01 | | | | | Comparative examples |
| 59 | rolled | 670 | 4 | 420 | 12 | 3 | 0.3 | | | | | |
| 60 | steel | 680 | 3 | 430 | 15 | 1 | 0.3 | | | | | |
| 61 | sheet | 580 | 4 | 480 | 10 | 25 | 0.2 | | | | | |
| 62 | | 670 | 5 | 700 | 70 | 5 | 0.2 | | | | | |
| 63 | | 660 | 6 | 720 | 80 | 7 | 0.2 | | | | | |
| 64 | | 650 | 3 | 540 | 40 | 8 | — | | | | | |
| 65 | | 620 | 4 | 540 | 50 | 15 | 2.5 | | | | | |
| 66 | | 680 | 5 | — | 0.5 | 8 | — | 6 | | | | |
| 67 | | 680 | 6 | — | 1 | — | — | 10 | | | | |
| 68 | | 580 | 2.8 | 480 | 35 | 3 | 0.2 | | | | | |

TABLE 2

| No. | Partial volume fraction of α-Mg phase (%) | Partial volume fraction of Al$_3$Mg$_2$ phase (%) | Total partial volume fraction (%) | Manufacturability | Shear cut edge corrosion resistance | Processed part corrosion resistance | Long-term immersion potential | Corrosion resistance after coating | Weldability | |
|---|---|---|---|---|---|---|---|---|---|---|
| 1 | 0.9 | 0.2 | 1.1 | B | 3 | 3 | B | 3 | B | Examples |
| 2 | 2.3 | 0.5 | 2.8 | B | 3 | 3 | B | 3 | B | |
| 3 | 3.2 | 0.6 | 3.9 | B | 3 | 3 | B | 3 | B | |
| 4 | 5.5 | 1.1 | 6.6 | B | 3 | 3 | B | 3 | B | |
| 5 | 6.9 | 1.4 | 8.3 | B | 3 | 3 | B | 3 | B | |
| 6 | 9.2 | 1.8 | 11.0 | B | 3 | 3 | B | 4 | B | |

TABLE 2-continued

| No. | Partial volume fraction of α-Mg phase (%) | Partial volume fraction of Al₃Mg₂ phase (%) | Total partial volume fraction (%) | Manufacturability | Shear cut edge corrosion resistance | Processed part corrosion resistance | Long-term immersion potential | Corrosion resistance after coating | Weldability | |
|---|---|---|---|---|---|---|---|---|---|---|
| 7  | 1.0  | 0.2   | 1.1  | B | 3 | 3 | B | 3 | B | |
| 8  | 2.4  | 0.4   | 2.8  | B | 3 | 3 | B | 3 | B | |
| 9  | 3.4  | 0.6   | 3.9  | B | 3 | 3 | B | 3 | B | |
| 10 | 5.7  | 1.0   | 6.7  | B | 3 | 3 | B | 3 | B | |
| 11 | 7.2  | 1.2   | 8.4  | B | 3 | 3 | B | 4 | B | |
| 12 | 9.6  | 1.6   | 11.2 | B | 3 | 3 | B | 3 | B | |
| 13 | 1.0  | 0.1   | 1.1  | B | 3 | 3 | B | 3 | A | |
| 14 | 2.6  | 0.2   | 2.8  | A | 3 | 3 | B | 3 | A | |
| 15 | 3.7  | 0.3   | 4.0  | B | 3 | 3 | B | 3 | A | |
| 16 | 6.3  | 0.6   | 6.8  | B | 3 | 3 | B | 4 | A | |
| 17 | 7.8  | 0.7   | 8.5  | B | 3 | 3 | B | 3 | A | |
| 18 | 10.4 | 0.9   | 11.4 | B | 3 | 3 | B | 3 | A | |
| 19 | 1.9  | 1.1   | 3.0  | A | 5 | 5 | B | 4 | A | |
| 20 | 5.7  | 3.3   | 9.0  | B | 3 | 3 | B | 3 | A | |
| 21 | 4.8  | 2.7   | 7.5  | A | 4 | 4 | B | 4 | A | |
| 22 | 6.7  | 3.8   | 10.5 | B | 5 | 5 | B | 4 | A | |
| 23 | 6.7  | 3.8   | 10.5 | B | 3 | 3 | B | 3 | A | |
| 24 | 11.4 | 6.6   | 18.0 | B | 4 | 4 | B | 4 | A | |
| 25 | 14.3 | 8.2   | 22.5 | B | 5 | 5 | B | 5 | A | |
| 26 | 19.0 | 10.9  | 30.0 | A | 5 | 5 | B | 4 | A | |
| 27 | 4.8  | 2.7   | 7.5  | B | 5 | 5 | B | 4 | A | |
| 28 | 4.8  | 2.7   | 7.5  | B | 5 | 5 | B | 4 | A | |
| 29 | 4.8  | 2.7   | 7.5  | A | 5 | 5 | B | 4 | A | |
| 30 | 6.7  | 3.8   | 10.5 | A | 5 | 5 | B | 4 | A | |
| 31 | 6.7  | 3.8   | 10.5 | A | 5 | 5 | B | 4 | A | |
| 32 | 6.7  | 3.8   | 10.5 | B | 5 | 5 | B | 5 | A | |
| 33 | 1.9  | 1.1   | 3.0  | B | 3 | 3 | B | 3 | A | |
| 34 | 6.7  | 3.8   | 10.5 | B | 3 | 3 | B | 3 | B | |
| 35 | 6.7  | 3.8   | 10.5 | B | 3 | 3 | B | 3 | B | |
| 36 | 8.6  | 4.9   | 13.5 | A | 3 | — | B | 3 | — | |
| 37 | 4.8  | 2.7   | 7.5  | A | 5 | — | B | 5 | — | |
| 38 | 7.6  | 4.4   | 12.0 | B | 5 | — | B | 4 | — | |
| 39 | 3.8  | 2.2   | 6.0  | B | 3 | — | B | 3 | — | |
| 40 | 0.7  | 2.8   | 3.5  | B | 3 | 3 | A | 3 | B | |
| 41 | 1.8  | 7.0   | 8.8  | B | 3 | 3 | A | 3 | B | |
| 42 | 2.5  | 9.8   | 12.3 | B | 3 | 3 | A | 3 | B | |
| 43 | 4.2  | 16.8  | 21.0 | B | 3 | 3 | A | 3 | B | |
| 44 | 5.3  | 21.0  | 26.3 | B | 3 | 3 | A | 3 | B | |
| 45 | 7.0  | 28.0  | 35.0 | B | 3 | 3 | A | 3 | B | |
| 46 | 0.5  | 2.8   | 3.3  | A | 3 | 3 | A | 3 | B | |
| 47 | 1.2  | 7.0   | 8.2  | A | 3 | 3 | A | 3 | B | |
| 48 | 1.6  | 9.8   | 11.4 | A | 3 | 3 | A | 3 | B | |
| 49 | 2.8  | 16.8  | 19.6 | A | 3 | 3 | A | 3 | B | |
| 50 | 3.5  | 21.0  | 24.5 | A | 3 | 3 | A | 3 | B | |
| 51 | 4.7  | 28.0  | 32.7 | A | 3 | 3 | A | 3 | B | |
| 52 | 0.4  | 2.8   | 3.2  | A | 3 | 3 | A | 3 | B | |
| 53 | 0.9  | 7.0   | 7.9  | A | 3 | 3 | A | 3 | B | |
| 54 | 1.8  | 35.0  | 36.8 | A | 3 | 3 | A | 3 | B | |
| 55 | 1.4  | 7.0   | 8.4  | A | 3 | 3 | A | 3 | B | |
| 56 | 1.1  | 5.6   | 6.7  | C | 3 | 3 | A | 3 | B | |
| 57 | 0.8  | 4.2   | 5.0  | B | 3 | 3 | A | 3 | B | |
| 58 | 2.0  | 9.8   | 11.8 | D | 1 | 1 | B | 1 | D | Comparative examples |
| 59 | 0.8  | 4.2   | 5.0  | C | 1 | 1 | C | 1 | D | |
| 60 | 0.3  | 1.4   | 1.7  | C | 1 | 1 | C | 1 | D | |
| 61 | 13.1 | 1.2   | 14.2 | C | 2 | 2 | B | 2 | D | |
| 62 | 0.2  | 0.01  | 0.2  | C | 1 | 1 | C | 1 | D | |
| 63 | 0.1  | 0.05  | 0.2  | C | 2 | 2 | C | 2 | B | |
| 64 | 4.2  | 0.4   | 4.6  | C | 2 | 2 | C | 2 | D | |
| 65 | 7.8  | 0.7   | 8.5  | C | 2 | 2 | C | 2 | D | |
| 66 | 2.2  | 11.2  | 13.4 | A | 1 | 1 | C | 1 | D | |
| 67 | —    |       |      | A | 1 | 1 | D | 1 | D | |
| 68 | 0.2  | 0.5   | 0.7  | C | 2 | 2 | B | 2 | D | |

In Table 1, A represents the hot-rolled steel sheet, and B represents the equal leg angle steel in the base steel column. In addition, the upper case numeric values indicate values outside the present invention or outside the desirable ranges.

Since Nos. 58 to 61 have a low alloying temperature outside the bath, the alloying reaction does not proceed sufficiently, and the amount of Fe is outside the scope of the present invention. Therefore, the weldability of the plates is poor.

Nos. 62 to 63 have a high alloying temperature outside the bath, and the α-Mg phase and the Al₃Mg₂ phase are lost, and the results of a variety of tests on corrosion resistance are poor.

INDUSTRIAL APPLICABILITY

As described above, according to the present invention, it is possible to stably provide a steel having an aluminum alloy plated layer which has excellent corrosion resistance, particularly, both shear cut edge corrosion resistance and processed part corrosion resistance, and which does not corrode for a long period of time even in a relatively dry environment or a highly humid and severely corrosive environment due to the effects of an $\alpha$-Mg phase in a plate, and is versatile as a structural material. Therefore, the present invention has a large potential for being used as a versatile structural material in a variety of manufacturing industries or construction industries.

The invention claimed is:

1. A hot-dip aluminum alloy plated steel comprising a base steel and a plated layer, wherein:
    a composition of the plated layer contains, by % by mass, Fe: 25% to 75%, Mg: 2% to 20%, and Ca: 0.02% to 2% with a remainder of Al and inevitable impurities;
    the plated layer contains one or both of an $\alpha$-Mg phase and an $Al_3Mg_2$ phase; and
    a sum of a volume fraction of the $\alpha$-Mg phase and a volume fraction of the $Al_3Mg_2$ phase in an area that is from a surface of the plated layer to a depth of 5 μm is 1% to 40%.

2. The hot-dip aluminum alloy plated steel according to claim 1, wherein the volume fraction of the $\alpha$-Mg phase is 0.4% to 20%.

3. The hot-dip aluminum alloy plated steel according to claim 1, wherein the volume fraction of the $Al_3Mg_2$ phase is 0.1% to 40%.

4. The hot-dip aluminum alloy plated steel according to claim 2, wherein an amount of Fe contained in the composition of the plated layer is 40% to 55%.

5. The hot-dip aluminum alloy plated steel according to claim 3, wherein an amount of Fe contained in the composition of the plated layer is 30% to 50%.

6. The hot-dip aluminum alloy plated steel according to claim 1, wherein the composition of the plated layer further contains, by % by mass, at least one of Si: 0.0001% to 2%, REM: 0.0001% to 1%, or Sr: 0.0001% to 2%.

7. The hot-dip aluminum alloy plated steel according to claim 6, wherein the REM is an La—Ce alloy.

8. A hot-dip aluminum alloy plated steel, wherein coating is applied on the hot-dip aluminum alloy plated steel according to claim 1.

9. A method of manufacturing the hot-dip aluminum alloy plated steel according to claim 1, the method comprising:
    a plating process in which the base steel is immersed in a plating bath; and
    an alloying thermal treatment process in which the base steel is held at a temperature of 500° C. or higher, and 700° C. or lower, for a duration of more than 3 seconds and 60 seconds or less in a state in which the base steel is immersed in the plating bath or after the base steel is removed from the plating bath.

10. A method of manufacturing the hot-dip aluminum alloy plated steel according to claim 2, the method comprising:
    a plating process in which the base steel is immersed in a plating bath; and
    an alloying thermal treatment process in which the plated base steel is heated at a temperature of 500° C. or higher, and 700° C. or lower, for a duration of more than 3 seconds and 60 seconds or less after the base steel is removed from the plating bath.

11. A method of manufacturing the hot-dip aluminum alloy plated steel according to claim 3, the method comprising:
    a plating process in which the base steel is immersed in a plating bath; and
    an alloying thermal treatment process in which the base steel is held at a temperature of 500° C. or higher, and 700° C. or lower, for a duration of more than 3 seconds and 60 seconds or less in a state in which the base steel is immersed in the plating bath,
    wherein no alloying thermal treatment is performed after the plated base steel is removed from the plating bath.

* * * * *